US006862741B1

(12) United States Patent
Grooters (10) Patent No.: US 6,862,741 B1
(45) Date of Patent: Mar. 1, 2005

(54) SYSTEM AND METHOD FOR DISPLAYING EVENT RELATED ELECTRONIC PROGRAM GUIDE DATA ON INTELLIGENT REMOTE DEVICES

(75) Inventor: Brandon A. Grooters, Bedford, TX (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 09/470,537

(22) Filed: Dec. 22, 1999

(51) Int. Cl.[7] .................. H04N 5/44; H04N 17/18; H04N 5/445; G06F 3/00; G06F 13/00

(52) U.S. Cl. .................. 725/39; 725/80; 725/81; 348/734

(58) Field of Search ............... 348/734; 725/39–56, 725/80, 81, 74–85, 134; H04N 5/44, 7/18, 5/445; G06F 3/00, 13/00

(56) References Cited

U.S. PATENT DOCUMENTS

| 4,115,846 A | 9/1978 | Laine |
| 4,697,209 A | 9/1987 | Kiewit et al. |
| 4,706,121 A | 11/1987 | Young |

(List continued on next page.)

FOREIGN PATENT DOCUMENTS

WO   WO 99/60782 A1   12/1999   ............ H04N/5/44

OTHER PUBLICATIONS

Pen Computer Solutions, Inc.; http://www.pencomputersolutions.com/integration.htm; Aug. 31, 1999.
Motorola Unveils First 'Internet–Ready' Integrated Digital Wireless Handset; http://www.mot.com/LMPS/iDEN/press/release26.html; Aug. 31, 1999.
Web in the Palm VII of Your Hand; http://www.pcworld.com/pcwtoday/article/0,1510,11129,00.html; Aug. 31, 1999.

(List continued on next page.)

Primary Examiner—Brian P. Yenke
(74) Attorney, Agent, or Firm—Christopher Rueppell; Suiter - West (57) ABSTRACT

A method and system for displaying event related program content and program guide data are disclosed. Upon the occurrence of an event such as a channel selection or change input, event related program content is displayed on a display coupled to an information handling system that functions as a host device and a tuning device for tuning to channels on which program content is broadcast. The information handling system further includes electronic program guide (EPG) data that includes program information for available programs. A portion of the EPG data that is related to the event being displayed is transmitted to a remote device that is capable of displaying the event related program guide data on a display of the remote device. The remote device allows a user to view and to browse event related program guide data on the remote device display such that the viewability of program content displayed on the display coupled to the information handling system is maximized, and any interference with the viewability of the program content is minimized. A bi-directional communications link is provided between the remote device and the information handling system and may be an infrared or radio-frequency link. The user may thereby browse event related programming information for other channels without detracting from the present channel, and may browse for event related programming information for the present channel over a predetermined time interval.

5 Claims, 4 Drawing Sheets

U.S. PATENT DOCUMENTS

| | | | |
|---|---|---|---|
| 4,751,578 A | | 6/1988 | Reiter et al. |
| 5,151,789 A | | 9/1992 | Young |
| 4,706,121 A | | 12/1993 | Young |
| 5,353,121 A | | 10/1994 | Young et al. |
| 5,410,326 A | * | 4/1995 | Goldstein ................... 348/734 |
| 5,500,691 A | * | 3/1996 | Martin et al. ............... 348/734 |
| 5,532,754 A | | 7/1996 | Young et al. |
| 5,550,576 A | | 8/1996 | Klosterman |
| 5,559,548 A | | 9/1996 | Davis et al. |
| 5,614,940 A | | 3/1997 | Cobbley et al. |
| 5,625,608 A | | 4/1997 | Grewe et al. |
| 5,629,733 A | | 5/1997 | Youman et al. |
| 5,635,978 A | | 6/1997 | Alten et al. |
| 5,657,072 A | * | 8/1997 | Aristides et al. .............. 725/46 |
| 5,686,954 A | | 11/1997 | Yoshinobu et al. |
| 5,689,663 A | * | 11/1997 | Williams .................... 345/721 |
| 5,699,107 A | | 12/1997 | Lawler et al. |
| 5,706,334 A | | 1/1998 | Balk et al. |
| 5,708,845 A | | 1/1998 | Wistendahl et al. |
| 5,710,605 A | * | 1/1998 | Nelson ....................... 348/734 |
| 5,721,942 A | | 2/1998 | Nishiyama et al. |
| 5,732,338 A | | 3/1998 | Schwob |
| 5,751,282 A | | 5/1998 | Girard et al. |
| 5,751,372 A | | 5/1998 | Forson |
| 5,758,257 A | | 5/1998 | Herz et al. |
| 5,760,821 A | | 6/1998 | Ellis et al. |
| 5,781,226 A | * | 7/1998 | Sheehan .................... 725/134 |
| 5,793,438 A | | 8/1998 | Bedard |
| 5,794,207 A | | 8/1998 | Walker et al. |
| 5,801,753 A | | 9/1998 | Eyer et al. |
| 5,801,787 A | | 9/1998 | Schein et al. |
| 5,805,204 A | | 9/1998 | Thompson et al. |
| 5,805,235 A | | 9/1998 | Bedard |
| 5,815,194 A | * | 9/1998 | Ueda .......................... 725/100 |
| 5,831,664 A | * | 11/1998 | Wharton et al. ............ 345/156 |
| 5,857,201 A | | 1/1999 | Wright, Jr. et al. |
| 5,864,784 A | | 1/1999 | Brayton et al. |
| 5,877,756 A | * | 3/1999 | Um ............................ 345/719 |
| 5,883,677 A | * | 3/1999 | Hofmann .................... 348/584 |
| 5,889,950 A | | 3/1999 | Kuzma |
| 5,898,398 A | * | 4/1999 | Kumai .................. 340/825.22 |
| 5,911,582 A | | 6/1999 | Redford et al. |
| 5,929,849 A | | 7/1999 | Kikinis |
| 6,002,394 A | | 12/1999 | Schein et al. |
| 6,002,444 A | | 12/1999 | Marshall et al. |
| 6,002,450 A | * | 12/1999 | Darbee et al. ......... 340/825.72 |
| 6,005,533 A | * | 12/1999 | Wilson ........................ 345/2.3 |
| 6,040,829 A | * | 3/2000 | Croy et al. .................. 345/817 |
| 6,097,441 A | * | 8/2000 | Allport ........................ 348/734 |
| 6,104,334 A | * | 8/2000 | Allport .................. 340/825.24 |
| 6,130,726 A | * | 10/2000 | Darbee et al. .............. 348/734 |
| 6,239,845 B1 | * | 5/2001 | Itagaki et al. ............... 348/552 |
| 6,263,503 B1 | * | 7/2001 | Margulis ...................... 725/81 |
| 6,278,499 B1 | * | 8/2001 | Darbee et al. .............. 348/734 |
| 6,285,357 B1 | * | 9/2001 | Kushiro et al. ............. 345/168 |
| 6,292,283 B1 | * | 9/2001 | Grandbois ................... 348/734 |
| 6,313,887 B1 | * | 11/2001 | Gudorf ........................ 348/552 |

OTHER PUBLICATIONS

Data Partners; http://www.zdnet.com__/freshgear/firstlook/jump/0,3681,2264076,00.html; Aug. 31, 1999.
Internetweek: Extending the Internet; http://www.techweb.com/se/directlink.cgi?INW19990621S0070; Aug. 31, 1999.
TrueSync Technology; http://www.starfish.com/products/clipon/clipon.html; Aug. 31, 1999.
Compaq Aero 2100 Color Palm–sized PC; http://www.ad-net.com__/freshgear/firstlook/story/0,3679,2209629, 00.html; Aug. 31, 1999.
Palm Programming: The Developer's Guide; http://www.com/exec/obidos/__/15.../qid=936122504/sr=2–3/002–7507153–4997208; Aug. 31, 1999.
3Com's new Palm VII adds Internet access to hand–held computing; http://www.sfgate.com/cgi–bin/ar__gi...iner/archive/1999/05/20/BUSINESS13229.dtl; Aug. 31, 1999.
Palm VII enters wireless Net realm; http://www.news.com/News/Item/0,4,36957,00.html; Aug. 31, 1999.
DVX8000 Multimedia Home Theater; http://safesound.com/html/dvx–8000.html; Sep. 8, 1999.
Marantz RC–2000 Mk.II; http://national.sidewalk.msn.com/Link/7468; Sep. 7, 1999.
Press releases archive; http://www.news.philips.com/archief/199708291.html; Sep. 2, 1999.
Berlin: Philips Converges; http://commu__town.com/news/articles/philipstvpc090297gtt.html; Sep. 7, 1999.
Air Apparent What's Really Driving the Wireless Future? The Cell Phone; Wired Jul. 1999.

* cited by examiner

SYSTEM AND METHOD FOR DISPLAYING EVENT RELATED ELECTRONIC PROGRAM GUIDE DATA ON INTELLIGENT REMOTE DEVICES

FIELD OF THE INVENTION

The present invention generally relates to the field of information handling systems, and particularly to information handling systems that utilize electronic program guide data.

BACKGROUND OF THE INVENTION

An electronic program guide (EPG) is a collection of programming information for programs available for broadcast to an end user via a network. For example, an electronic program guide contains information regarding the date, time and channel for the broadcast of one or more television programs. Electronic program guides may be downloaded from a remote server to the user and processed by an information handling system coupled to a television device, or by an information handling system that itself provides television functionality. Typically, the program guide is displayed on a display (e.g., television or monitor) in a grid style format so that the user can easily browse the EPG data for programs of interest.

It is of interest to utilize a remote intelligent device to control an information handling system that displays broadcast or downloaded programming. It is of further interest to download and store electronic program guide data on the remote intelligent device independently from the information handling system. However, portable remote intelligent devices often have hardware and memory constraints such that storing a larger sized electronic program guide on the remote intelligent device is impractical. Thus, there lies a need to present EPG data to an intelligent remote device in a format in accordance with the hardware constraints of the remote intelligent device. There lies a further need to provide EPG data to an intelligent remote device that is responsive to an input or control event, and that is efficiently tailored to the input or control event. Thus there lies a need for a system that allows a user to view and to browse through program guide data with a remote intelligent device based upon a dynamic input or control event.

SUMMARY OF THE INVENTION

The present invention is directed to a system for displaying program content and program guide data related to an event such as a channel selection or change. In one embodiment, the system includes a first information handling system coupled to a first display, a second information handling system communicatively coupled with the first information handling system and having a second display disposed on a housing thereof, wherein the first information handling system is capable of displaying program content on the first display and is capable of communicating event related program guide data to the second information handling system for displaying events related program guide data on the second display. In another embodiment, the system includes a means for receiving event related program content and event related program guide data, a first means coupled with the receiving means for displaying th event related program content, a means for obtaining event related program guide data from the receiving means, and a second means coupled with the obtaining means for displaying the event related program guide data obtained from the receiving means.

The present invention is further directed to a method for displaying event related program guide data in response to the occurrence of the event. In one embodiment, the method includes steps for sending a request for event related program guide data to a host device, fetching event related program guide data upon receiving the request, transmitting the event related program guide data to a remote device, and displaying at least a portion of the event related program guide data upon receiving the event related program guide data on a display of the remote device such that event related program guide data may be viewed independently from program content. In another embodiment, the method may be embodied as a program of instructions storable on a computer readable medium for causing an information handling system to execute steps for displaying event related program guide data. In one such embodiment, the steps include steps for receiving an input for causing an information handling system to fetch event related program guide data from a database, for transmitting the event related program guide data from the information handling system to a remote device via a communications link between the information handling system and the remote device, for storing the transmitted event related program guide data in a memory of the remote device, and for displaying at least a portion of the event related program guide data stored in the memory on a display disposed on a housing of the remote device.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention, and together with the general description, serve to explain the principles of the invention.

BRIEF DESCRIPTION OF THE DRAWING

The numerous advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
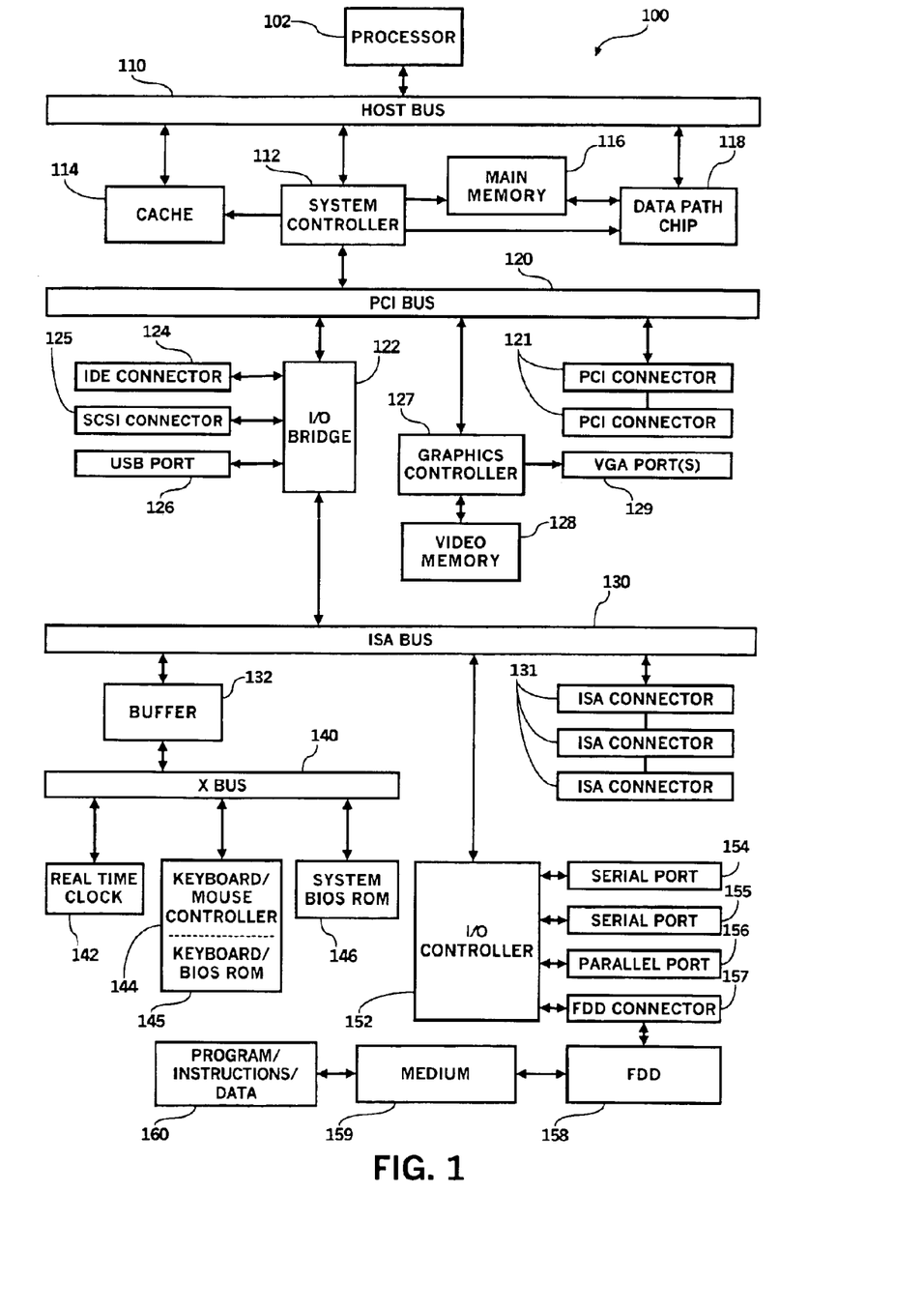
FIG. 1 is a block diagram of an information handling system operable to tangibly embody the present invention.

FIG. 1 shows a block diagram of an information handling system 100 in accordance with the present invention. In this embodiment, processor 102, system controller 112, cache 114, and data path chip 118 are each coupled to host bus 110. Processor 102 is a microprocessor such as a 486-type chip, a Pentium®, Pentium II®, Pentium III®, or the like suitable microprocessor. Cache 114 provides high-speed local-memory data (in one embodiment, for example, 512 KB of data) for processor 102, and is controlled by system controller 112, which loads cache 114 with data that is expected to be used soon after the data is placed in cache 114 (i.e. in the near future). Main memory 116 is coupled between system controller 112 and data path chip 118, and in one embodiment, provides random-access memory of between 16 MB and 128 MB of data.

In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding these components and many of the other components shown in FIG. 1. Main memory 116 includes standard DRAM (Dynamic Random-Access Memory), EDO (Extended Data Out) DRAM, SDRAM (Synchronous DRAM), or the like suitable memory technology. System controller 112 controls PCI (Peripheral Component Interconnect) bus 120, a local bus for system 100 that provides a high-speed data path between processor 102 and various peripheral devices, such as video, disk, network, etc. Data path chip 118 is also controlled by system controller 112 to assist in routing data between main memory 116, host bus 110, and PCI bus 120.

In one embodiment, PCI bus 120 provides a 32-bit-wide data path that runs at 33 MHz. In another embodiment, PCI bus 120 provides a 64-bit-wide data path that runs at 33 MHz. In yet other embodiments, PCI bus 120 provides 32-bit-wide or 64 bit-wide data paths that run at higher speeds. In one embodiment, PCI bus 120 provides connectivity to I/O bridge 122, graphics controller 127, and one or more PCI connectors 121, each of which accepts a standard PCI card (not shown). In one embodiment, I/O bridge 122 and graphics controller 127 are each integrated on the motherboard along with system controller 112, in order to avoid a board-to-connector-to-board signal crossing interface, thereby providing better speed and reliability. In the embodiment shown, graphics controller 127 is coupled to a video memory 128 that includes memory such as DRAM, EDO DRAM, SDRAM, or VRAM (Video Random-Access Memory), and drives VGA (Video Graphics Adapter) port 129. VGA port 129 can connect to VGA-type or SVGA (Super VGA)-type displays or the like. Other input/output (I/O) cards having a PCI interface can be plugged into PCI connectors 121.

In one embodiment, I/O bridge 122 is a chip that provides connection and control to one or more independent IDE connectors 124, to one or more SCSI connectors 125, to one or more USB (Universal Serial Bus) ports 126, and to an ISA (Industry Standard Architecture) bus 130. In this embodiment, IDE connector 124 provides connectivity for up to two or more standard IDE-type devices such as hard disk drives, CD-ROM (Compact Disk-Read-Only Memory) drives, DVD (Digital Video Disk or Digital Versatile Disk) drives, or TBU (Tape-Backup Unit) devices.

In an alternative embodiment, two IDE connectors 124 may be provided, each providing an EIDE (Enhanced IDE) compliant architecture. In the embodiment shown, Small Computer System Interface (SCSI) connector 125 provides connectivity for preferably up to seven or fifteen SCSI-type devices depending on the version of SCSI supported by the respective embodiment. In an alternative embodiment, I/O bridge 122 is placed in communication with the ISA bus 130 comprising one or more ISA connectors 131 (in one embodiment, three connectors may be provided). In one embodiment, ISA bus 130 is coupled to I/O controller 152, which in turn provides connections to two serial ports 154 and 155, parallel port 156, and FDD (Floppy-Disk Drive) connector 157. In one embodiment, FDD connector 157 is connected to FDD 158 that receives removable media (floppy diskette) 159 on which data and/or program code 160 is stored.

In one such embodiment, program code 160 includes code that controls programmable system 100 to perform a method as described in accordance with the present invention. In another such embodiment, serial port 154 is connectable to a computer network such as the Internet, and such network has program code 160 that controls programmable system 100 to perform a method as described in accordance with the invention. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146. FIG. 1 shows an exemplary embodiment of the present invention having many of the various alternative elements shown. However, other bus structures and memory arrangements are specifically contemplated. It should be appreciated that modification or reconfiguration of information handling system 100 of FIG. 1 by a person of ordinary skill in the art would not depart from the scope or the spirit of the present invention.

Figure 2:
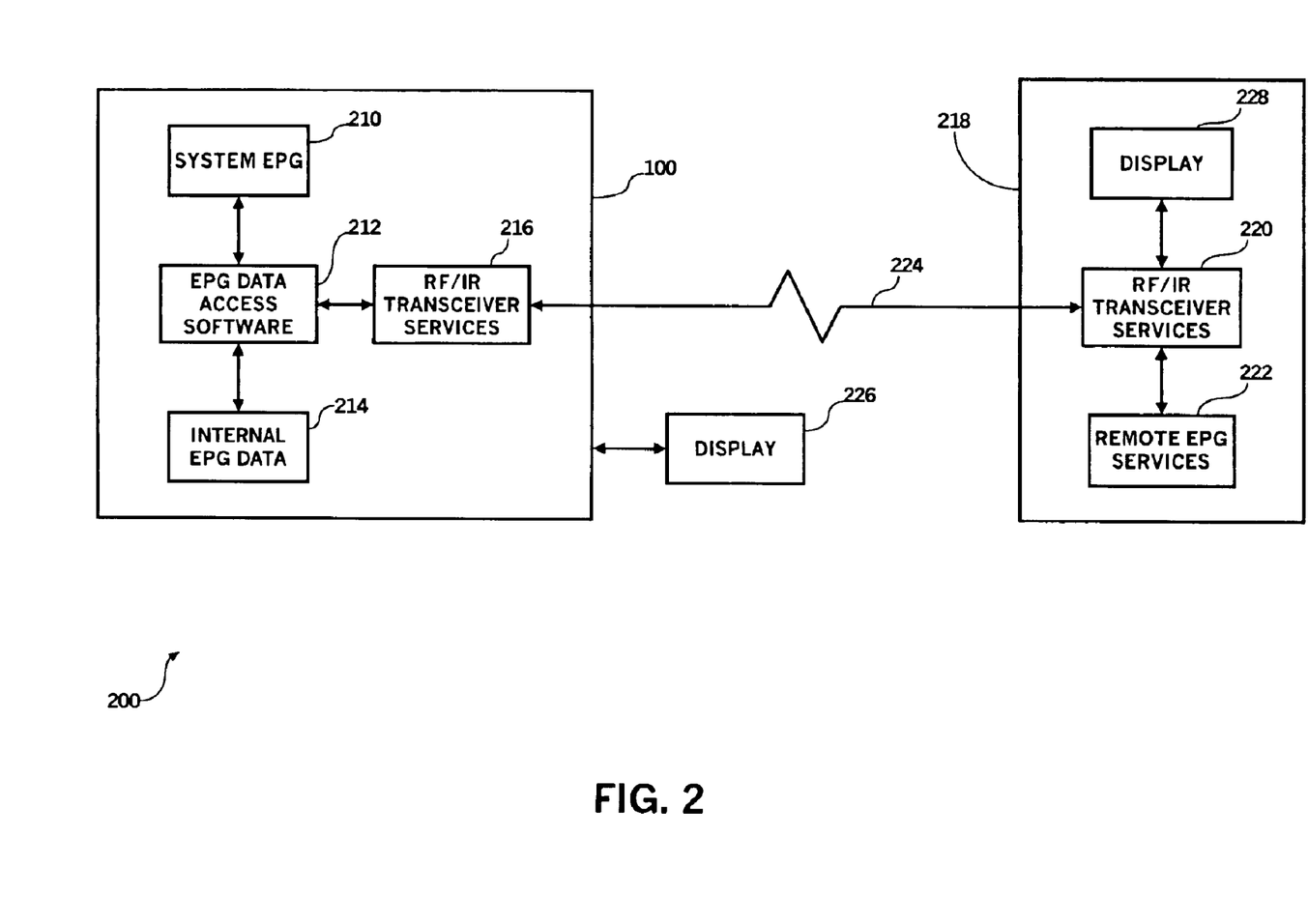
FIG. 2 is a block diagram of a system for displaying program content and electronic program guide data in accordance with the present invention.

Referring now to FIG. 2, a block diagram of a system for displaying program content and program guide data will be discussed. System 200 includes a first information handling system 100 coupled with display 226. Information handling system 100 is capable of causing display 226 to display program content and EPG data 214, either alone or in combination. Information handling system 100 is communicatively coupled via a communications link 224 to a second information handling system 218 that is similar to information handling system 100 as described with respect to FIG. 1. Second information handling system 218 is a remote device for controlling information handling system 100, and is typically of a size and shape to allow a user to hold the second information handling system 218 in their hands during operation. Further, second information handling system 218 is typically powered from at least one battery, or wireless power source, that is disposed within a housing of the second information handling system 218. As such, second information handling system 218 typically requires less features and functions than information handling system 100, so that not all of the hardware devices of information handling system 100 may be required, although any one or more of the hardware devices of FIG. 1 may be utilized.

Information handling system 100 receives and stores EPG data 214 in internal memory or information storage device (e.g., main memory 116 or storage medium 159) for later retrieval. EPG data access software 212 is a program of instructions storable in a memory or information storage medium of information handling system 100 for retrieving EPG data 214 and for providing the EPG data 214 to a system EPG 210 of information handling system 210. The system EPG 210 is capable of enabling EPG data to be displayed on display 226 for viewing by a user.

In operation, second information handling system 218 obtains EPG data 214 from information handling system 100 via communications link 224. Second information handling system 218 then displays EPG data 214 on display 228. Display 228 is disposed on a surface of the housing of second information handling system for displaying various information of interest to the user. In the embodiment shown in FIG. 2, information handling system 100 includes a first transceiver and transceiver services 216, and the second information handling system includes a second transceiver and transceiver services 220, for enabling communication via communications link 224. Transceivers 216 and 220 may be, for example, radio-frequency or infrared (RF/IR) transceivers such that communications link 224 may provide wireless communications between information handling system 100 and second information handling system 218. Second transceiver and transceiver services 220 is coupled to remote EPG services 222 for providing EPG functions with second information handling system 218.

Upon the occurrence of a predetermined event, second information handling system 218 provides a request to information handling system 100 for EPG data 214. In an alternative embodiment, the information handling system 100 can be designed to automatically communicate with the second information handling system 218 upon the occurrence of a predetermined event. The predetermined event may be a channel change, a time change, or any user directed or initiated event. One or more actuators or buttons may be disposed on the housing of second information handling system 218 for allowing a user to input control information into second information handling system 218 by actuating an actuator or button. The request is transmitted from transceiver 220 to transceiver 216 via communications link 224. The request is then passed to EPG data access software 212 and processed. The appropriate EPG data 214, or portion thereof according to the request, is returned to EPG data access software 212 which in turn provides returned EPG data 214 to transceiver 216. The returned EPG data 214 is transmitted to second information handling system 218 by being transmitted from transceiver 216 to transceiver 220 via communications link 224. Since requests may be transmitted from transceiver 220 to transceiver 216 and EPG data 214 may be transmitted from transceiver 216 to transceiver 220 communications link 224 provides bi-directional communication between information handling system 100 and second information handling system 218. When EPG data 214 is obtained from information handling system 100 by second information handling system 218, EPG data 214 may be stored in a memory or information storage medium of second information handling system 218. At least a portion of EPG data 214 may be displayed on display 228. The user may then view EPG data 214 displayed on display 228, and may browse through the contents thereof by actuating an actuator or button disposed on a housing of second information handling system 218. For example, in the case where not all of the obtained EPG data 214 is displayed simultaneously on display 228, the user may browse through the remaining, undisplayed portion of the obtained EPG data 214 by inputting an appropriate command into second information handling system 218 whereby undisplayed information may be displayed, and a portion of the displayed information is no longer displayed (e.g., by displaying a portion of a stack or list).

The obtaining and displaying of EPG data 214 on display 228 may be initiated by user activated events. For example, the user may utilize second information handling system 218 to change the channel that information handling system 100 displays on display 226. When the user causes a channel change event, the channel change event may include the step of sending a request to information handling system 100 to provide EPG data 214 for the new requested channel. Alternatively, a request for EPG data 214 may be sent at periodic intervals such that EPG data 214 stored in a memory or storage medium of second information handling system 218 and/or displayed on display 228 may be updated as time passes. Second information handling system 218 may allow a user to browse EPG data 214 on display 228 for programming information corresponding to the channel displayed on display 226 for various predetermined ranges of time (e.g., for the most recent time block plus three hours into the future). Alternatively, the user may browse EPG data 214 on display 228 for programming information corresponding to other channels not being displayed on display 226 (e.g., so the user can determine what is being simultaneously broadcast on other channels while watching the presently displayed channel).

Figure 3:
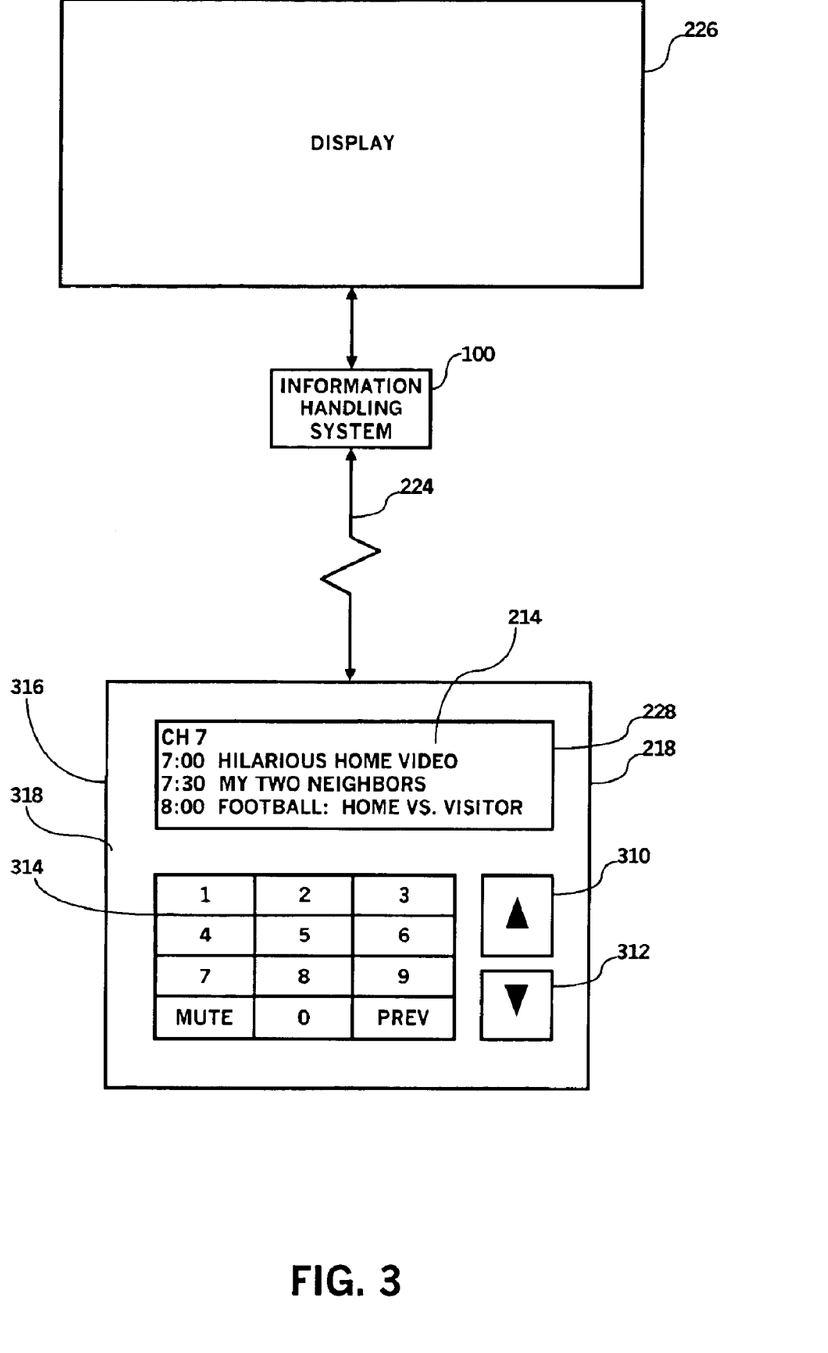
FIG. 3 is a block diagram of a system for displaying program content and electronic program guide data in accordance with the present invention, further showing a remote device having a display for displaying program guide data.

Referring now to FIG. 3, a block diagram of a system for displaying electronic program guide data in accordance with the present invention will be discussed. As shown in FIG. 3, second information handling system 218 includes a display 228 for displaying electronic program guide data 214 or any portion thereof received from information handling system 100. Second information handling system 218 may be a handheld, portable, remote device optimized for controlling information handling system 100 at a distance therefrom. In one configuration, display 228 is disposed on a first surface 318 of the housing 316 of second information handling system 218. One or more actuators 310 and 312 may also be disposed on first surface 318 for receiving an input command or data from the user. For example, actuator 310 may be utilized for causing information handling system 100 to display on display 226 the program content of the next available channel in order of increasing channel number, and actuator 312 may be utilized for causing information handling system 100 to display on display 226 the program content of the next available channel in order of decreasing channel number, when actuated by the user. It is understood that the term actuator is not limited to a physical selection device. An actuator function may be accomplished via a software-driven touch-screen LCD display. This manner of operation may be similar to a standard television remote control. For example, if the presently displayed channel is channel 7, actuation of actuator 310 may cause information handling system 100 to tune to channel 9 (e.g., if channel 8 were unavailable or not programmed into memory), the next higher succeeding channel, and actuation of actuator 312 may cause information handling system 100 to tune to channel 6, the next lower succeeding channel. Second information handling system 218 may further include an array of actuators 314 for providing various input commands or data, including numerical data a "mute" command to turn on or off the audio portion of program content when toggled, or a "prev" (previous channel) to jump to the previously entered channel when actuated, etc. Actuation of any one of actuator 310, 312 or one of the array 314 of actuators, may cause second information handling system 218 to send a request to information handling system 100 for electronic program guide information 214.

For example, in one embodiment, when the user enters "37" to tune to channel 37, second information handling system 218 sends a command to information handling system 100 to tune to channel 37, to fetch electronic program guide data 214 corresponding to channel 37, and then to transmit the requested program guide data 214 to second information handling system 218 via communications link 224. The obtained program guide data 214 may then be displayed in whole or in part on display 228 by second information handling system 218. As shown in FIG. 3, program guide data 214 displayed on display 228 may include, for example, the present channel number and the programming information for the displayed channel for a predetermined range of time. In an embodiment where not all of the obtained program guide data 214 is displayed simultaneously on display 228, the user may browse through the remaining undisplayed data, for example, by actuation of actuators 310 and 312, to cause the remaining undisplayed data to be displayed on display 228. As shown in FIG. 3, programming information for channel 7 is displayed for the predetermined beginning time range of 7:00 to 8:00. The user may cause 6:30 programming information to be displayed by actuating actuator 310, or may cause 8:30 programming information to be displayed by actuating actuator 312, such that the programming information "scrolls" up or down over the available program times. In the event the user requests EPG data 214 for a time presently not available to second information handling system 218, a request may be sent to information handling system 100 to obtain EPG data for that time. By using display 228 of second information handling system 100 as an auxiliary display to display 226, all of the program content for a given channel may be displayed on display 228 at full size and resolution and without detraction or blocking of the program content, while electronic program guide data 214 is simultaneously displayed on display 228 and viewable or browsable by the user. Alternatively, system 200 also allows electronic program guide data 214 to be displayed on display 226 in a minimally invasive or interfering manner (e.g., in a smaller portion, time slots or channels only, etc.). When the user highlights a particular time slot or channel on the minimally invasive program guide (e.g., with a cursor control device that may be, for example, second information handling system 218), the program guide data 214 corresponding to the highlighted time slot or channel may be transmitted to second information handling system 218 and displayed on display 228 rather than on display 226, thereby providing a higher level of viewability of program content on display 226.

Figure 4:
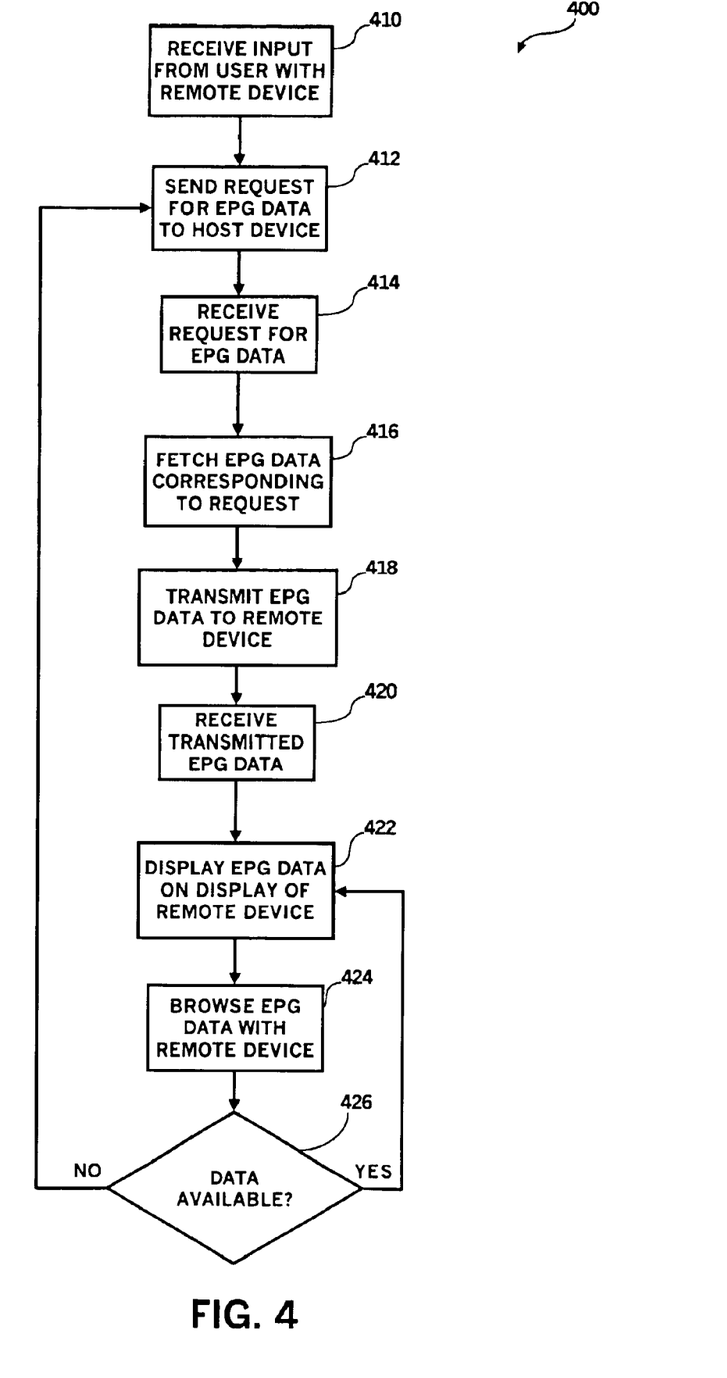
FIG. 4 is a flow diagram of a method for displaying program guide data in accordance with the present invention.

Referring now to FIG. 4, a method for displaying program guide data will be discussed. It is understood that the specific order, or hierarchy, disclosed in FIG. 4 is an example of one approach. Based upon design preferences, it is understood that the specific order, or hierarchy, can be rearranged while remaining within the scope of the present invention. The attached method claims present elements of the various steps in a sample order, and are not meant to be limited to the specific order or hierarchy presented. The method 400 may be implemented as a program of software instructions executed by information handling system 100 or second information handling system 218, alone or in combination. The program of instructions may be stored, for example, in a memory device (e.g., main memory 116) or on a computer readable medium (e.g., medium 159). Method 400 initiates, in one embodiment, when second information handling system 218 receives an input from the user at step 410. Alternatively, step 410 may be modified such that method 400 initiates when information handling system 100 receives an input from a user. The input may be, for example, a channel change or selection input. A request for EPG data 214 is sent at step 412 to information handling system 100 acting as a host device. When information handling system 100 receives the request at step 414, EPG data 214 corresponding to the request is fetched at step 416. For example, if the input by the user is a command to tune to channel 7, the request to fetch EPG data 214 may correspond to fetch EPG data 214 for channel 7 only (and not other channels). Furthermore, if the present time is near 7:00, EPG data 214 may be fetched only for a predetermined time period (e.g., the present time plus one hour), such as programming information from 7:00 to 8:00. The fetched EPG data 214 is transmitted at step 418 from information handling system 100 to second information handling system 218 (e.g., the remote device). Second information handling system receives the transmitted EPG data 214 at step 420, and then displays the EPG data 214, or a portion thereof, on a display (e.g., display 228) of second information handling system 218 at step 422. The user may then browse through EPG data 214 at step 424. The user may desire to browse through EPG data 214 corresponding to a channel, time, or other criterion (e.g., additional information, close captioning data, etc.) that may not be available or that may not have yet been obtained by second information handling system. A determination is made at step 426 whether the desired EPG data 214 is available on second information handling system 218. In the event the desired EPG data is available, method 400 continues by displaying the EPG data 214 on display 228 at step 422. In the event the desired EPG data is not available, a request is sent to information handling system 100 in step 412 to obtain the desired EPG data 214.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 116 of one or more computer information handling systems configured generally as described in FIG. 1. Until required by the computer system, the set of instructions may be stored in another computer readable memory such as the information storage medium 159 of FIG. 1, which could include a hard disk drive, a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions, applets or servlets physically changes the medium upon which it is stored electrically, magnetically, chemically, physically, optically or holographically so that the medium carries computer readable information.

The system and method for displaying electronic program guide data on intelligent remote devices of the present invention and many of its attendant advantages are disclosed by the forgoing description, and it is understood that various changes may be made in the form, construction and arrangement of the components thereof without departing from the scope and spirit of the invention, or without sacrificing all of its material advantages. The embodiments disclosed herein are merely explanatory embodiments thereof. It is the intention of the following claims to encompass and include such changes.

What is claimed is:

1. A method for displaying program information comprising:

upon occurrence of an event, sending a request for program guide data to a second information handling system from a first information handling system;

upon receiving the request, fetching event related program guide data;

transmitting the event related program guide data to the first information handling system; and upon receiving the event related program guide data, displaying at least a portion of the event related program guide data on a first display of the first information handling system, wherein said event related program guide data on said first display corresponds to electronic program guide data displayed on a second display of said second information handling system.

2. The method as claimed in claim 1, wherein said first display includes a display of content and the display of electronic program guide data simultaneously.

3. The method as claimed in claim 2, wherein the electronic program guide displayed on said first display of said first information handling system is displayed in at least one of a minimally invasive and minimally interfering manner.

4. The method as claimed in claim 2, wherein the electronic program guide displayed on said first display of said first information handling system is displayed in a portion smaller than said display of content.

5. The method as claimed in claim 1, further comprising determining whether the event related program guide data is available in the first information handling system, and in the event the event related program guide data is not available, executing said sending step.

* * * * *